Patented Aug. 22, 1939

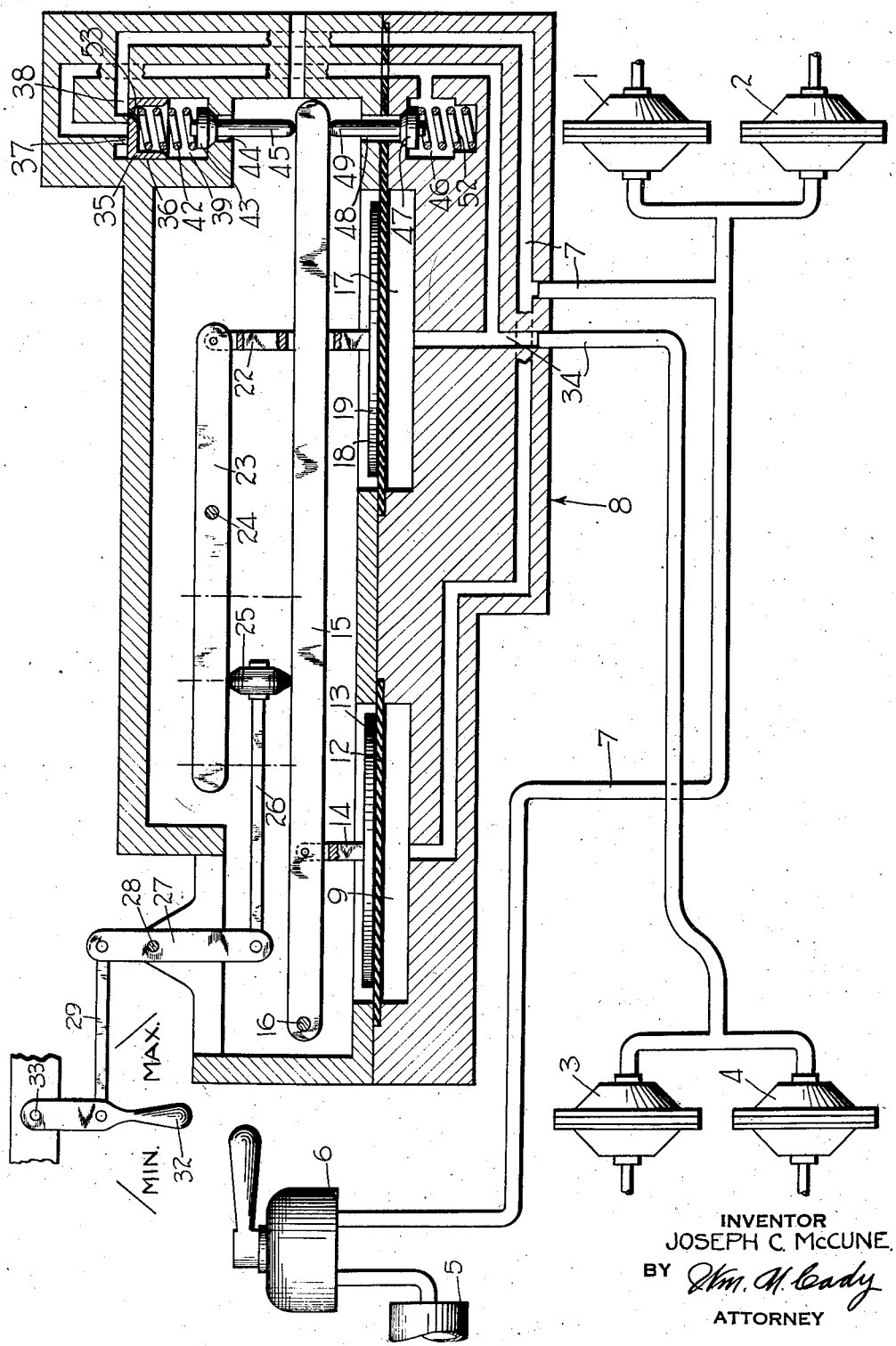

2,170,086

UNITED STATES PATENT OFFICE 2,170,086

FLUID PRESSURE BRAKE

Joseph C. McCune, Edgewood, Pa., assignor to The Westinghouse Air Brake Company, Wilmerding, Pa., a corporation of Pennsylvania Application July 17, 1936, Serial No. 91,049

9 Claims. (Cl. 188—152)

This invention relates to brake equipment for automotive vehicles and more particularly to means for varying the relative braking forces exerted on the front and rear wheels of the vehicle.

In road vehicles such as trolley coaches, buses and trucks it is highly desirable to obtain the maximum braking force on all wheels at all times. It has been found that on dry pavements, or where good traction is afforded, the front brakes of a vehicle may be called upon to do a considerable proportion of the total braking work without hazarding the steering control. The traction conditions, however, play an important part in the amount of braking possible on the front wheels without locking the wheels and losing the steering control, and if the front brakes are called upon to do the same work when the pavements are wet as may be permitted when dry, steering control is lost. It will be seen, therefore, that, in order to obtain the maximum effectiveness of the brakes upon a vehicle under varying pavement conditions, without losing steering control, it is desirable to vary the braking effectiveness on the front wheels of the vehicle.

It is an object of my invention to provide, in a brake system of the above indicated character, means for varying the braking work done on the front wheels of the vehicle.

It is a further object of my invention to provide, in a brake equipment of the above indicated character, means for varying the braking ratio on the front and rear wheels of the vehicle, and for maintaining a selected ratio.

Other objects and advantages of my invention will be apparent from the following description of one preferred embodiment thereof, reference being had to the accompanying drawing in which the single figure is a diagrammatic view of a preferred embodiment of the invention.

Referring to the drawing, the single figure is a diagrammatic view of one preferred embodiment of the invention in which diaphragm brake chambers 1 and 2 are provided for applying the brakes to the rear wheels of the vehicles, and the diaphragm brake chambers 3 and 4 control the application and release of the brakes on the front wheels of the vehicle.

A main reservoir 5 is provided, constituting a source of fluid under pressure for applying the brakes as controlled by the usual brake valve device 6, as supplied to a brake cylinder supply pipe 7 leading to the diaphragm brake chambers 1 and 2 and to the passage 7 of a regulating device 8.

The regulating device 8 comprises a diaphragm chamber 9 that is in constant open communication with passage and pipe 7, and is provided with a diaphragm 12 constituting one wall of the chamber, the diaphragm having a follower plate 13 provided with a stem 14 connected to a scale beam 15 that is pivotally mounted on a pin 16. A second diaphragm chamber 17 is also provided within the casing of the regulating device 8 having a diaphragm 18 constituting one wall thereof, and a follower plate 19 associated therewith and having a stem 22 connected to one end of a lever 23 that is pivotally supported upon a pin 24, and the opposite end of which is adapted to engage a strut 25 positioned between the left hand end of the lever 23 and the scale beam lever 15 for communicating upward pressure on the diaphragm 18 downwardly to the scale beam 15 at a point determined by the position of the strut 25. The strut 25 is movable toward the right or left by a mechanism consisting of the rod 26, a lever 27 pivotally mounted on a pin 28, the upper end of which is connected to one end of a rod 29, the other end of which is connected to a manually operable lever 32 pivotally connected to any suitable support by a pivot pin 33.

The diaphragm chamber 17 is connected by passage and pipe 34 to the diaphragm brake chambers 3 and 4 associated with the front wheels of the vehicle, and by passage 34 to the face of a relay valve piston 35 contained within a bore 36 provided in the casing and adapted to engage a rib seat 37. A chamber 38 is provided about the rib seat 37 that is in constant communication with passage and pipe 7, and a chamber 39 is provided in the lower part of the bore 36 below the relay valve 35 containing a spring 42, the upper end of which engages the under side of the valve piston 35 and the lower end of which engages the pilot valve 43 for controlling communication between the chamber 39 and the atmosphere through exhaust port 44. The pilot valve 43 is provided with a stem 45 that is adapted to engage the upper side of the right hand end of the scale beam 15. A chamber 46 is also provided within the casing of the regulating device 8, that is in constant communication with passage 34 and contains a valve 47 for controlling communication between said chamber and the atmosphere through exhaust port 48, the valve 47 being provided with a stem 49 for engaging the lower side of the right hand end of the scale beam 15. A spring 42 is provided within the chamber 46 for biasing the valve 47 toward its seat.

When the operator wishes to apply the brakes the handle of the brake valve device 6 is moved to effect the supply of fluid under pressure in the usual way from the main reservoir 5 to the brake chamber pipe 7 and to the brake chambers 1 and 2 associated with the rear vehicle wheels. Fluid under pressure is also supplied at brake chamber pipe pressure to the diaphragm chamber 9 and to the chamber 38 above the valve piston 35, and through the small port 53 in the valve piston to the chamber 39. As the pressure increases in the diaphragm chamber 9, the diaphragm 12, follower 13 and stem 14 move upwardly to move the scale beam 15 in a counterclockwise direction about the pin 16, thus forcing the right hand end of the beam 15 against the stem 45 to unseat the pilot valve 43 and effect the release of fluid under pressure from the chamber 39 to the atmosphere through exhaust port 44. Since fluid under pressure is released from the chamber 39 at a more rapid rate than it is supplied thereto through the small port 53 in the valve piston 35, the greater pressure on the upper side of the valve piston 35 forces the valve downwardly from its rib seat 37 against the bias of the spring 42 to effect the supply of fluid under pressure from the passage 7 through passage 34 to the diaphragm chamber 17, and through passage and pipe 34 to the diaphragm brake chambers 3 and 4 associated with the front wheels of the vehicle. As the pressure builds up in the diaphragm chamber 17 the upward force of the diaphragm 18 on the follower plate 19 is communicated by stem 22 to the right hand end of the lever 23 that is pivotally supported on the pin 24, thus effecting a downward pressure on the left hand end of the lever 23 against the strut 25 and the upper side of the scale beam 15.

If when the brakes are applied it is desired to provide a brake chamber pressure in the front wheel brake chambers 3 and 4 which is less than the brake chamber pressure obtained in the rear wheel brake chambers 1 and 2, the strut 25 is moved to a position such that the lever ratio set up will result in movement of the lever mechanism when the pressure in chamber 17 has been built up to a degree less than the pressure in chamber 9.

Assuming that the strut 25 is in such position that the upward pressure on the diaphragm 18 will cause a force to be exerted on the beam 15 tending to move it in a clockwise direction that is sufficient to balance the force exerted by the diaphragm 12 tending to move the beam 15 in a counterclockwise direction before the pressure in the diaphragm chamber 17, and in the brake chambers 3 and 4, has increased to a value corresponding to the pressure in the brake chamber pipe 7, the chamber 9, and in the diaphragm brake chambers 1 and 2, the right hand end of the beam 15 will be moved downwardly a sufficient amount to permit the valve 43 to be seated by the spring 42. The flow of fluid under pressure from the chamber 38 through the small port 53 in the valve piston 35 will cause the pressure in the chambers 38 and 39 to rapidly equalize and permit the spring 42 to force the valve 35 piston upwardly to its rib seat 37 to close communication between the passages 7 and 34.

As the manually operated lever 32 is moved toward the left from its illustrated position, the strut 25 is moved toward the right, thus shortening the lever arm between the strut 25 and the pivot pin 24 and lengthening the lever arm between the strut 25 and the pivot pin 16, to correspondingly increase the downward force exerted by the strut 25 against the upper side of the scale beam 15 for a constant pressure in the diaphragm chamber 17, and applying this greater force at a point on the beam 15 at a greater distance from the pivot pin 16, thus increasing the moment of force tending to move the beam 15 in a clockwise direction. It will therefore be seen that with the strut 25 in a position to the right of its illustrated position, a lesser force in the diaphragm chamber 17, and in the brake chambers 3 and 4, will balance the pressure in the diaphragm chamber 9 and permit the seating of the pilot valve 43 and of the poppet valve 35. On the other hand, movement of the strut 25 toward the left from its illustrated position will necessitate an increase in the pressure within the diaphragm chamber 17 necessary to balance the force of the fluid under pressure in the diaphragm chamber 9.

If the pressure in the diaphragm chamber 9 is reduced below that value necessary to maintain the beam 15 in its illustrated or balanced position, the greater upward force of the diaphragm 18 against the strut 25 will move the beam 15 downwardly, forcing the valve 47 from its seat to release fluid under pressure from the diaphragm brake chambers 3 and 4 and the diaphragm chamber 17 to the atmosphere through exhaust port 48.

It will be noted that, for any given position of the strut 25, the pressure in the diaphragm chamber 17, and in the brake chambers 3 and 4 associated with the front wheels of the vehicle, will bear a definite ratio to the pressure in the diaphragm chamber 9, and in the diaphragm brake chambers 1 and 2 associated with the rear wheels of the vehicle, the particular ratio depending upon the position of the lever 32 and of the strut 25. As the lever 32 is moved toward the left, the strut is moved toward the right, and the permitted pressure in the brake chambers 3 and 4 is less for the same pressure in the rear brake chambers 1 and 2, while as the lever 32 is moved toward the right the permitted pressures in the brake chambers 3 and 4 increases with respect to the pressures in the chambers 1 and 2.

Many modifications may be made in the apparatus described without departing from the spirit of my invention, and I do not wish to be limited otherwise than by the scope of the appended claims.

Having now described my invention, what I claim as new and desire to secure by Letters Patent, is:

1. In a fluid pressure brake equipment for vehicles, in combination, pressure brake chambers for applying brakes on the rear vehicle wheels, pressure brake chambers for applying brakes on the front vehicle wheels, means for supplying fluid under pressure to said rear brake chambers, regulating means responsive to the pressure at which fluid is supplied to said rear brake chambers for controlling the supply of fluid under pressure to said front brake chambers to maintain a predetermined ratio between the pressures in said front and rear chambers, and manually operable means for gradually adjusting between two valves the ratio between the pressure at which fluid is supplied to said front brake chambers and the pressure at which fluid is supplied to said rear brake chambers.

2. In a fluid pressure brake equipment for vehicles, in combination, pressure responsive brake means for applying the brakes at the rear of the vehicle, pressure responsive brake means for applying the brakes at the front of the vehicle, means for supplying fluid under pressure to apply the brakes, regulating means for maintaining a selected ratio between the pressure at which fluid is supplied to said two pressure responsive brake means, said regulating means comprising valve means for controlling the supply of fluid under pressure to apply the brakes at the front of the vehicle, a pressure responsive element subject to the pressure supplied to apply the brakes at the rear of the vehicle, a pressure responsive element subject to the pressure supplied to apply the brakes at the front of the vehicle, and mechanism including cooperating levers subject to the opposing pressures of said two pressure responsive elements for actuating said valve means to effect the supply of fluid under pressure to the pressure responsive brake means for applying the brakes at the front of the vehicle at a selected ratio with respect to the pressure of the fluid supplied to the pressure responsive brake means for applying the brakes at the rear of the vehicle.

3. In a fluid pressure brake equipment for vehicles, in combination, pressure responsive means for applying the brakes at the rear of the vehicle, pressure responsive means for applying the brakes at the front of the vehicle, means for supplying fluid under pressure to the pressure responsive means for applying the brakes at the rear of the vehicle, and regulating means including a lever for controlling the supply of fluid under pressure to the pressure responsive means for applying the brakes at the front of the vehicle and the release of fluid under pressure therefrom, means for biasing said lever in one direction in accordance with the degree of application of the brakes at the rear of the vehicle, a second lever, means for biasing said second lever in accordance with the degree of application of the brakes at the front of the vehicle and for applying the force of said second lever in opposition to the bias of said first named lever, valve means controlled by said first named lever for controlling the supply of fluid under pressure for applying the brakes to the front end of the vehicle, and valve means controlled by said lever for controlling the release of fluid under pressure for decreasing the braking force at the front of the vehicle.

4. In a fluid pressure brake equipment for vehicles, in combination, pressure responsive means for applying the brakes at the rear of the vehicle, pressure responsive means for applying the brakes at the front of the vehicle, means for supplying fluid under pressure to the pressure responsive means for applying the brakes at the rear of the vehicle, and regulating means for controlling the supply of fluid under pressure for applying the brakes at the front of the vehicle comprising a pressure responsive element subject to the degree of application of the rear brakes, a pressure responsive element subject to the degree of application of the front brakes, leverage mechanism for interlinking the opposite forces of these two pressure responsive elements, valve means actuated by said leverage mechanism for controlling the supply of fluid under pressure to the means for applying the brakes at the front of the vehicle, and valve means responsible to said lever mechanism for controlling the release of fluid under pressure from the means for applying the brakes at the front of the vehicle to maintain a predetermined ratio between the degree of application of the brakes at the front and rear of the vehicle.

5. In a vehicle brake equipment, in combination, pressure responsive means for applying the brakes at the rear of the vehicle, pressure responsive means for applying the brakes at the front of the vehicle, means for supplying fluid under pressure to one of said pressure responsive means, valve means for supplying fluid under pressure to the other of said pressure responsive means at pressures in accordance with the pressure of the fluid supplied to said first named pressure responsive means to maintain a predetermined ratio therebetween, and manually operable means for adjusting said valve means to gradually vary between two valves the ratio maintained thereby between the pressures supplied to said pressure responsive means.

6. In a vehicle fluid pressure brake equipment, in combination, pressure responsive means for applying the brakes at the rear of the vehicle, pressure responsive means for applying the brakes at the front of the vehicle, means for supplying fluid under pressure to one of said pressure responsive means, and regulating means comprising a lever and valve means operated by said lever and controlling the supply of fluid under pressure to and the release of fluid under pressure from the other of said pressure responsive means, said lever being subject to the opposing forces of a movable abutment subject to the pressure of the fluid supplied to one of said pressure responsive means and a movable abutment subject to the pressure of the fluid supplied to the other of said pressure responsive means.

7. In a vehicle fluid pressure brake equipment, in combination, pressure responsive means for applying the brakes at the rear of the vehicle, pressure responsive means for applying the brakes at the front of the vehicle, means for supplying fluid under pressure to one of said pressure responsive means, and regulating means comprising a lever, valve means operated by said lever and controlling the supply of fluid under pressure to and the release of fluid under pressure from the other of said pressure responsive means, said lever being subject to the opposing forces of a movable abutment subject to the pressure of the fluid supplied to one of said pressure responsive means and a movable abutment subject to the pressure of the fluid supplied to the other of said pressure responsive means, and means to adjustably vary the point at which one of said abutments exerts force on said lever to thereby vary the ratio between the pressure in said one pressure responsive means and the pressure maintained in the other pressure responsive means by said regulating means.

8. In a vehicle fluid pressure brake equipment, in combination, pressure responsive means for applying the brakes at the rear of the vehicle, pressure responsive means for applying the brakes at the front of the vehicle, application means for supplying and releasing fluid under pressure to and from one of said pressure responsive means, a valve device for supplying and releasing fluid under pressure to and from the other of said responsive means, a movable abutment subject to the pressure of the fluid supplied to said one of said pressure responsive means, a movable abutment subject to the pressure of the fluid supplied to the other of said pressure responsive means, a member subject to the opposing forces of said abutments for operating said valve device, and means to adjustably vary the point at which one of said abutments exerts force on said member to thereby vary the force exerted by said abutment through said member on said valve device.

9. In a vehicle fluid pressure brake equipment, in combination, pressure responsive means for applying the brakes at the rear of the vehicle, pressure responsive means for applying the brakes at the front of the vehicle, application means for supplying and releasing fluid under pressure to and from one of said pressure responsive means, and a regulating device responsive to the pressure of the fluid supplied by said application means for supplying fluid under pressure to said other pressure responsive means to maintain the pressure therein at a value bearing a proportional or ratio relationship to that present in the first named pressure responsive means, said regulating device incorporating means by which the ratio of the pressure maintained by said regulating device in said other pressure responsive means to that in the first named pressure responsive means may be gradually adjustably varied between two values.

JOSEPH C. McCUNE.